(12) United States Patent  
Rowlands et al.

(10) Patent No.: US 12,032,432 B1  
(45) Date of Patent: Jul. 9, 2024

(54) IDENTIFYING HOST BUS ADAPATER FAULTS

(71) Applicant: Dell Products L.P., Hopkinton, MA (US)

(72) Inventors: Scott Rowlands, Cumming, GA (US); Krishna Deepak Nuthakki, Bangalore (IN); Arieh Don, Newton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/174,267

(22) Filed: Feb. 24, 2023

(51) Int. Cl.
*G06F 11/00* (2006.01)
*G06F 11/07* (2006.01)

(52) U.S. Cl.
CPC ........ *G06F 11/076* (2013.01); *G06F 11/0778* (2013.01)

(58) Field of Classification Search
CPC ............................ G06F 11/076; G06F 11/0778
USPC ........................................................ 714/1–57
See application file for complete search history.

(56) References Cited

U.S. PATENT DOCUMENTS

| | | | |
|---|---|---|---|
| 9,575,866 B1* | 2/2017 | Mourn | G06F 11/3027 |
| 10,908,987 B1* | 2/2021 | Pandey | G06F 3/0659 |
| 2004/0078720 A1* | 4/2004 | Ito | G06F 11/008 714/45 |

* cited by examiner

*Primary Examiner* — Sarai E Butler
(74) *Attorney, Agent, or Firm* — Anderson Gorecki LLP

(57) ABSTRACT

Target port resets sent from a host server are used to identify HBA faults. A storage array monitors receipt of resets and calculates reset counts for each HBA port of each host server. If there are more than X resets within Y seconds received by a storage array port from a particular HBA port, that HBA port is identified as faulty if the storage array port has not received resets from other HBAs or other ports of the same HBA. If the storage array port has received resets from other ports of the same HBA but not from other HBAs, then the HBA is identified as faulty. If the initiators are grouped, both the HBA port and HBA are identified as potentially faulty. If none of the HBAs or HBA ports are identified as faulty, the cause of the resets is localized to the storage array, inter-switch links, or congestion.

20 Claims, 5 Drawing Sheets

IDENTIFYING HOST BUS ADAPTER FAULTS

TECHNICAL FIELD

The subject matter of this disclosure is generally related to data storage systems.

BACKGROUND

Data centers include data storage nodes, servers, switches, and interconnecting cabling. The servers host instances of software applications for organizational processes such as email, accounting, inventory control, e-business, and engineering. Host application data is stored on logical storage objects that are maintained by the storage nodes. Input-output (IO) operations that access the storage objects are sent between the servers and storage nodes via the switches. Performance of a host application instance is dependent on performance of the server on which the instance runs, data access latency of the storage node, and performance of the interconnecting switches, including the physical communication links. Detecting and localizing problems in such a complex system is a difficult and slow manual process, particularly in the case of failures associated with the servers because they may be numerous. It is common practice to expedite repairs by replacing subsystems that could possibly be the problem without first localizing the fault to a particular server subsystem.

SUMMARY

A method in accordance with some implementations comprises: monitoring target resets sent by initiators from ports of host bus adapters of a plurality of host servers and received at a plurality of ports of a storage node; calculating counts of the target resets received from each port of the host bus adapters; and identifying a first port of a first host bus adapter of a first host server as faulty based on: receiving a predetermined number of the target resets from the first port of the first host bus adapter within a predetermined time period at a first port of the plurality of ports of the storage node; and not receiving target resets from other ports of the first host bus adapter.

An apparatus in accordance with some implementations comprises: a storage node comprising at least one compute node with local memory, at least one host adapter with ports, and a detector and localizer configured to: monitor target resets sent by initiators from ports of host bus adapters of a plurality of host servers and received at a plurality of ports of a storage node; calculate counts of the target resets received from each port of the host bus adapters; and identify a first port of a first host bus adapter of a first host server as faulty based on: receipt of a predetermined number of the target resets from the first port of the first host bus adapter within a predetermined time period at a first port of the plurality of ports of the storage node; and non-receipt of target resets from other ports of the first host bus adapter.

In accordance with some implementations, a non-transitory computer-readable storage medium stores instructions that are executed by a computer to perform a method comprising: monitoring target resets sent by initiators from ports of host bus adapters of a plurality of host servers and received at a plurality of ports of a storage node; calculating counts of the target resets received from each port of the host bus adapters; and identifying a first port of a first host bus adapter of a first host server as faulty based on: receiving a predetermined number of the target resets from the first port of the first host bus adapter within a predetermined time period at a first port of the plurality of ports of the storage node; and not receiving target resets from other ports of the first host bus adapter.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, such as abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
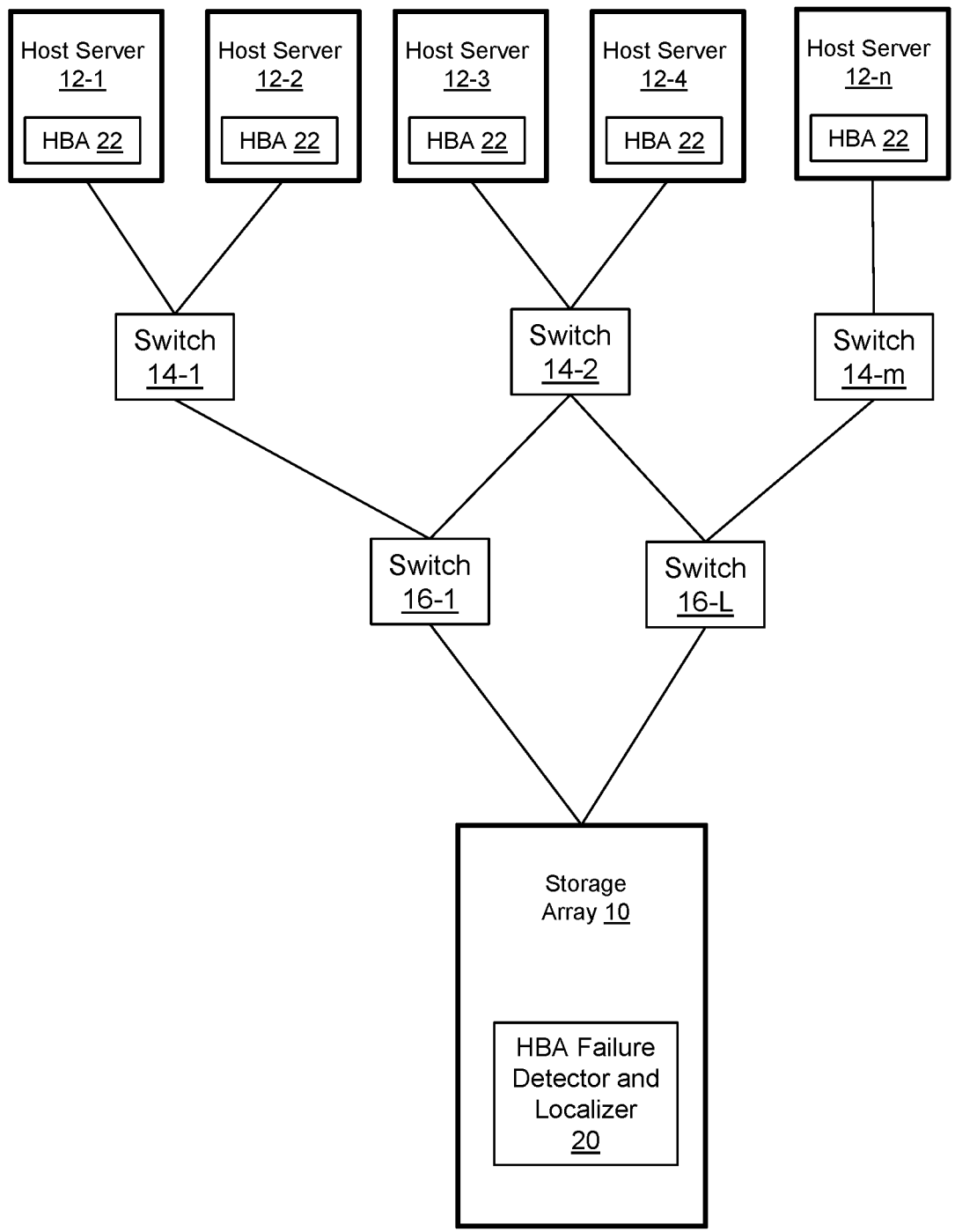
FIG. 1 illustrates a storage system in which a storage array uses a host bus adapter failure detector and localizer to identify host bus adapter faults.

FIG. 1 illustrates a storage system in which a storage array 10 uses a host bus adapter (HBA) failure detector and localizer 20 to identify faults in host bus adapters 22 and host bus adapter ports. The storage array maintains logical storage objects that are accessed by instances of host applications running on host servers 12-1 through 12-n (collectively 12). The host servers communicate with the storage array 10 via multiple layers of switches, including a layer of switches 16-1 through 16-L (collectively 16) that are logically adjacent to the storage array 10 and a layer of switches 14-1 through 14-m (collectively 14) that are logically adjacent to the host servers 12. The switches 14 that are logically adjacent to the host servers 12 are more numerous than the switches 16 that are logically adjacent to the storage array 10, and the host servers 12 are more numerous than the switches 14 that are logically adjacent to the host servers. Congestion or a fault can occur in one or more of the host servers, switches, storage array, and physical links between those nodes.

Figure 2:
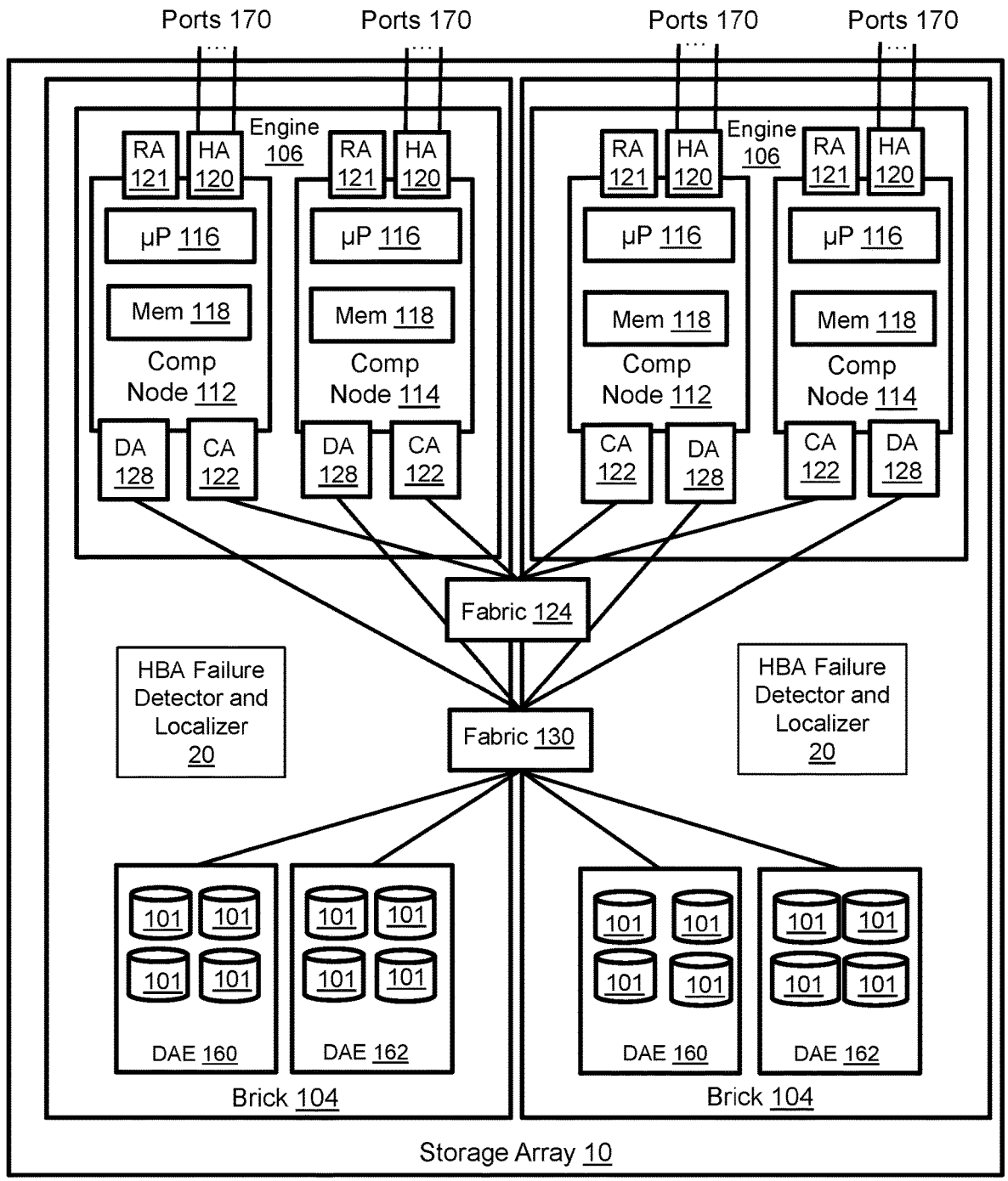
FIG. 2 illustrates the storage array in greater detail.

FIG. 2 illustrates the storage array 10 in greater detail. The storage array 10 includes one or more bricks 104. Each brick 104 includes an engine 106 and one or more disk array enclosures (DAEs) 160, 162. In the illustrated example there are only two engines, but the storage array could include a greater number of engines or a single engine. Each engine 106 includes two interconnected compute nodes 112, 114 that are arranged as a memory-mirrored pair for failover and may be referred to as "storage directors." Although it is known in the art to refer to the compute nodes of a SAN as "hosts," that naming convention is avoided in this disclosure to help distinguish the host servers 12 (FIG. 1) from the compute nodes 112, 114. Each compute node may be implemented on a separate printed circuit board or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers. Each host adapter has multiple ports 170 for communicating with the host servers, which may be referred to as "initiators" that send IO commands to the storage array as a "target." Each initiator-target port pair defines a path. Each host server may be connected to the storage array via multiple ports corresponding to multiple paths that enable load balancing and failover. The host adapter resources include processors, volatile memory, and components such as IO chips that monitor link errors and IO failures such as missing frames, timeouts, and received aborts. Each compute node also includes a remote adapter (RA) 121 for communicating with other storage systems, e.g., the other storage arrays. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. In some implementations, every disk adapter 128 in the storage array can reach every DAE via the fabric 130. Further, in some implementations every disk adapter in the storage array can access every managed disk 101. The HBA failure detector and localizer 20 may run as a distributed program on each of the bricks.

Figure 3:
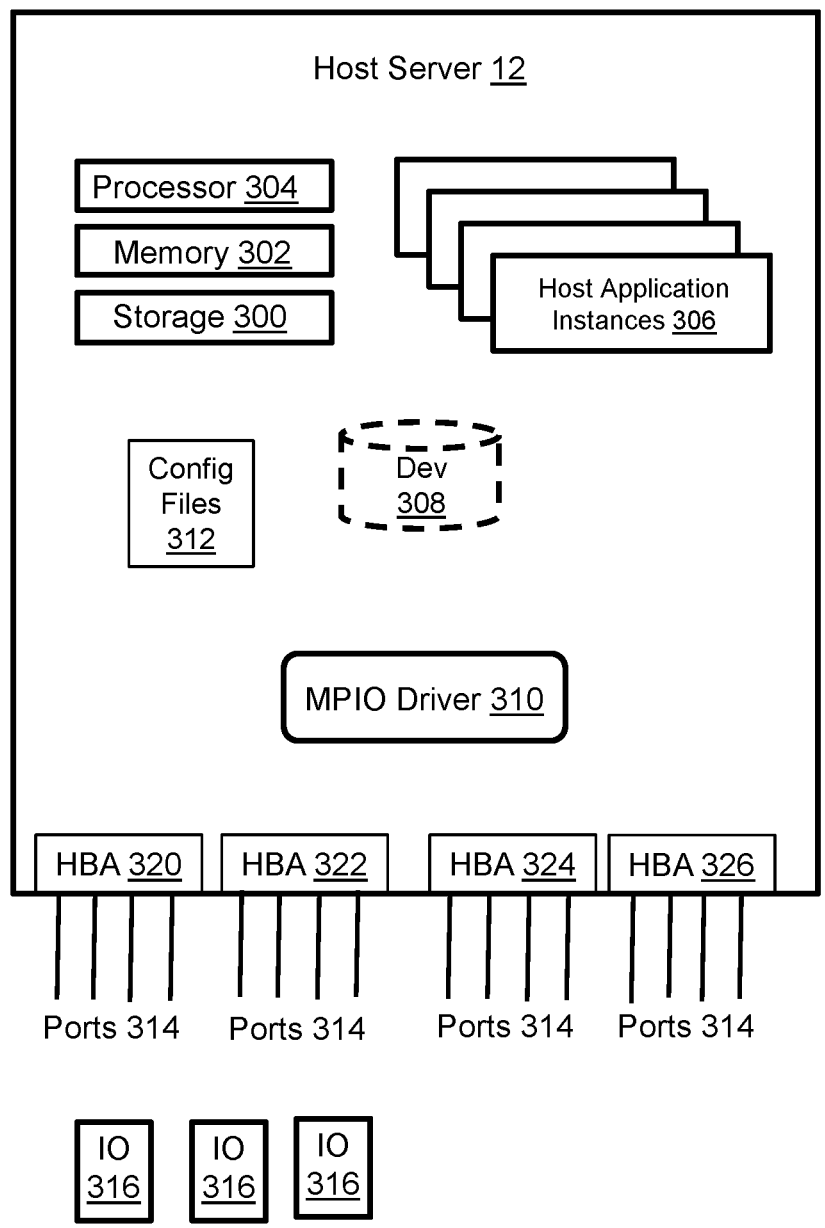
FIG. 3 illustrates one of the host servers in greater detail.

FIG. 3 illustrates one of the host servers 12 in greater detail. Each host server includes volatile memory 302, non-volatile storage 300, one or more tangible processors 304 that support host application instances 306, a Multi-Path Input-Output (MPIO) driver 310 running in the host kernel, and one or more host bus adapters (HBAs) 320, each with multiple ports 314. Each HBA port is associated with at least one worldwide name (WWN). The MPIO driver 310 discovers a storage object that is maintained and presented by the storage array. A corresponding logical host device 308 that is a representation of that storage object is generated locally for access by the host application instances. The host application instances 306 use the logical host device 308 for data access, e.g., to read and write host application data to logical addresses. Corresponding IOs 316 are generated and sent to the storage array via the MPIO driver and HBAs to access the storage object to read and write data. More specifically, the MPIO driver selects from among the multiple available paths between the host server and the storage array in order to balance IO loading. The IO is sent to the storage array via the HBA ports and storage array HA ports corresponding to the selected path. Configuration files 312 maintained by the host server include metadata that describes the paths supported by the host server. For example, the port IDs (WWNs) and authentication credentials for each supported path are included in the configuration files, which may be persistently stored in storage and copied into memory for low latency access during operation. The HBA includes components such as IO chips that monitor link errors and IO failures such as missing frames, timeouts, and received aborts.

Multiple host application instance initiators may be associated with an individual HBA port as an initiator group. N_Port ID Virtualization (NPID), for example, enables multiple Fibre Channel node port IDs to share a single physical port. Each port ID is associated with or matches a WWN, so multiple WWNs can be associated with the same HBA port. An initiator group may be identified by association with the WWN of the host server. On the storage array side, a masking view is used to map the WWNs to the storage objects to which the initiators are permitted access.

Figure 4:
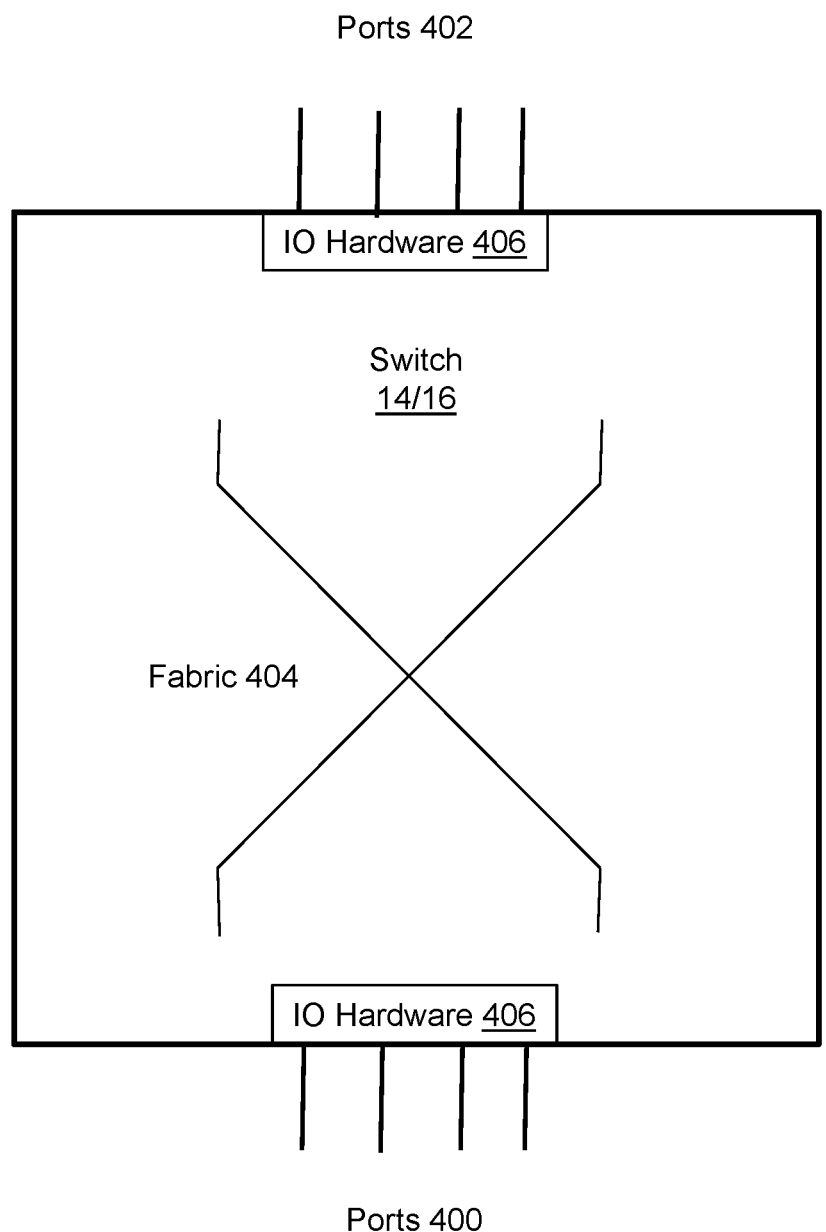
FIG. 4 illustrates one of the switches in greater detail.

FIG. 4 illustrates one of the switches 14/16 in greater detail. Each switch includes a first group of ports 400 that are interconnected with a second group of ports 402 via a fabric 404. For switch 14, ports 402 are host ports on the host server side of the paths and ports 400 are inter-switch link (ISL) ports that connect to ISL ports of a switch 16. For switch 16, ports 402 are ISL ports that connect to a switch 14 and ports 400 are storage ports on the storage array side of paths. The fabric 404 enables any of the ports 400 to be zoned to any of the ports 402 to redirect communications along the configured paths. IO hardware 406 associated with the ports includes components such as IO chips that monitor link errors and IO failures such as missing frames, timeouts, and received aborts.

Figure 5:
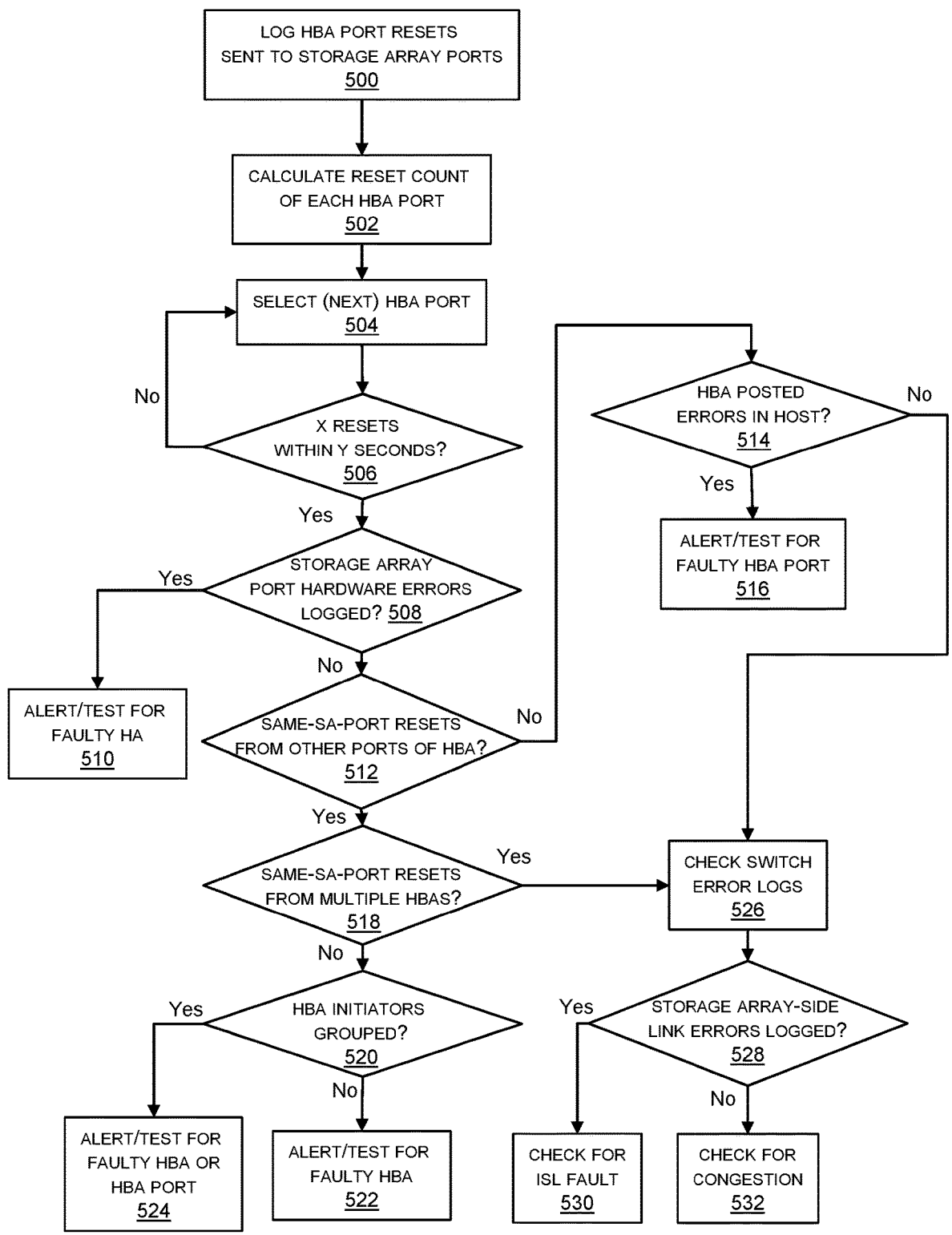
FIG. 5 illustrates a method for identifying host bus adapter faults.

FIG. 5 illustrates a method for identifying host bus adapter faults. The host adapters of the storage array monitor and log target resets, link errors, and IO failures such as missing frames, timeouts, and received aborts on a per-host-adapter-port basis, as indicated in step 500. As indicated in step 502, host adapter logs are used to calculate counts of resets received by host adapter ports from individual HBA ports. The counts include only target resets. A target reset causes the host adapter to flush local memory of IO commands and data associated with all storage objects masked to the HBA port that sent the target reset.

In contrast, a LUN reset affects only a subset of the storage objects masked to the HBA port. An individual HBA port is selected for analysis as indicated in step 504. If X target resets were not received within Y seconds from that HBA port as determined in step 506, then the next HBA port is selected for analysis in step 504. The values of X and Y may be selected, set, and updated by a system administrator. If X target resets were received within Y seconds from the selected HBA port as determined in step 506, then the storage array logs are checked to determine whether hardware errors were logged for the corresponding host adapter port of the storage array as indicated in step 508. If such hardware errors were logged, an alert is generated, and the host adapter is checked for faults as indicated in step 510. If such hardware errors were not logged, then step 512 is determining whether target resets were also received by the same storage array port from other ports of the same HBA. If target resets were not received on the same storage array port from other ports of the same HBA as determined in step 512, then step 514 is determining whether the HBA posted errors to a log in the host server. If so, then an alert is generated and the HBA port is checked for faults as indicated in step 516. In other words, the problem is localized to the HBA port.

If target resets were received on the same storage array port from other ports of the same HBA as determined in step 512, then step 518 is determining whether other HBAs sent resets to the same storage array port. If the answer is no, then step 520 is determining whether the target reset initiators are grouped. If the answer is no, then an alert is generated and the HBA is checked for faults as indicated in step 522. In other words, the problem is localized to the HBA. If the answer in step 520 is yes, then an alert is generated and both the HBA and HBA port are checked for faults as indicated in step 524. In other words, the problem is localized to the individual HBA port and the HBA.

If the HBA didn't post errors to a log in the host server as determined in step 514 or if other HBAs sent resets to the storage array port as determined in step 518, then the switch error logs are checked in step 526. If storage array-side link errors were logged as determined in step 528, then the inter-switch links are checked for faults as indicated in step 530. If storage array-side link errors were not logged as determined in step 528, then network congestion may be identified as the cause as indicated in step 532.

Flags may be generated by the HBA failure detector and localizer as part of the alert process. Each flag might include the fiber channel ID (FCID) and WWN of the storage array port at which the conditions that prompted generation of the flag were detected, the suspected problem type, the suspected ISL, fabric name, and the initiator FCID and WWN. Flags can be logged and sent to various recipients to prompt auto-remediation and notify administrators.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    monitoring target resets sent by initiators from ports of host bus adapters of a plurality of host servers and received at a plurality of ports of a storage node;
    calculating counts of the target resets received from each port of the host bus adapters; and
    identifying a first port of a first host bus adapter of a first host server as faulty based on:
        receiving a predetermined number of the target resets from the first port of the first host bus adapter within a predetermined time period at a first port of the plurality of ports of the storage node; and
        not receiving target resets from other ports of the first host bus adapter.

2. The method of claim 1 further comprising identifying the first port of the first host bus adapter of the first host server as faulty based on logging of host bus adapter errors in the first host server.

3. The method of claim 1 further comprising identifying a second host bus adapter of a second host server as faulty based on:
    receiving a predetermined number of target resets from a first port of the second host bus adapter within a predetermined time period at the first port of the plurality of ports of the storage node;
    receiving target resets from other ports of the second host bus adapter; and
    not receiving target resets from other ports of other host bus adapters.

4. The method of claim 3 further comprising identifying both the first port of the second host bus adapter and the second host bus adapter as potentially faulty based on determining that the initiators of the target resets are grouped.

5. The method of claim 1 further comprising identifying a storage array port as faulty based on logged hardware errors associated with the storage array port.

6. The method of claim 1 further comprising identifying an inter-switch link as faulty based on:
    receiving a predetermined number of target resets from a first port of a second host bus adapter within a predetermined time period at the first port of the plurality of ports of the storage node;
    receiving target resets from other ports of the second host bus adapter;
    receiving target resets from other ports of other host bus adapters; and
    logging storage array-side link errors.

7. The method of claim 1 further comprising identifying congestion as a cause for the resets based on:
    receiving a predetermined number of target resets from a first port of a second host bus adapter within a predetermined time period at the first port of the plurality of ports of the storage node;
    receiving target resets from other ports of the second host bus adapter;
    receiving target resets from other ports of other host bus adapters; and
    not logging storage array-side link errors.

8. An apparatus comprising:

a storage node comprising at least one compute node with local memory, at least one host adapter with ports, and a detector and localizer configured to:
monitor target resets sent by initiators from ports of host bus adapters of a plurality of host servers and received at a plurality of ports of a storage node;
calculate counts of the target resets received from each port of the host bus adapters; and
identify a first port of a first host bus adapter of a first host server as faulty based on:
receipt of a predetermined number of the target resets from the first port of the first host bus adapter within a predetermined time period at a first port of the plurality of ports of the storage node; and
non-receipt of target resets from other ports of the first host bus adapter.

9. The apparatus of claim 8 further comprising the detector and localizer configured to identify the first port of the first host bus adapter of the first host server as faulty based on host bus adapter errors logged in the first host server.

10. The apparatus of claim 8 further comprising the detector and localizer configured to identify a second host bus adapter of a second host server as faulty based on:
receipt a predetermined number of target resets from a first port of the second host bus adapter within a predetermined time period at the first port of the plurality of ports of the storage node;
receipt of target resets from other ports of the second host bus adapter; and
non-receipt of target resets from other ports of other host bus adapters.

11. The apparatus of claim 10 further comprising the detector and localizer configured to identify both the first port of the second host bus adapter and the second host bus adapter as potentially faulty based on a determination that the initiators of the target resets are grouped.

12. The apparatus of claim 8 further comprising the detector and localizer configured to identify a storage array port as faulty based on logged hardware errors associated with the storage array port.

13. The apparatus of claim 8 further comprising the detector and localizer configured to identify an inter-switch link as faulty based on:
receipt of a predetermined number of target resets from a first port of a second host bus adapter within a predetermined time period at the first port of the plurality of ports of the storage node;
receipt of target resets from other ports of the second host bus adapter;
receipt of target resets from other ports of other host bus adapters; and
logged storage array-side link errors.

14. The apparatus of claim 8 further comprising the detector and localizer configured to identify congestion as a cause for the resets based on:
receipt of a predetermined number of target resets from a first port of a second host bus adapter within a predetermined time period at the first port of the plurality of ports of the storage node;
receipt of target resets from other ports of the second host bus adapter;
receipt of target resets from other ports of other host bus adapters; and
absence of logged storage array-side link errors.

15. A non-transitory computer-readable storage medium storing instructions that are executed by a storage node to perform a method comprising:
monitoring target resets sent by initiators from ports of host bus adapters of a plurality of host servers and received at a plurality of ports of the storage node;
calculating counts of the target resets received from each port of the host bus adapters; and
identifying a first port of a first host bus adapter of a first host server as faulty based on:
receiving a predetermined number of the target resets from the first port of the first host bus adapter within a predetermined time period at a first port of the plurality of ports of the storage node; and
not receiving target resets from other ports of the first host bus adapter.

16. The non-transitory computer-readable storage medium of claim 15 in which the method further comprises identifying the first port of the first host bus adapter of the first host server as faulty based on logging of host bus adapter errors in the first host server.

17. The non-transitory computer-readable storage medium of claim 15 in which the method further comprises identifying a second host bus adapter of a second host server as faulty based on:
receiving a predetermined number of target resets from a first port of the second host bus adapter within a predetermined time period at the first port of the plurality of ports of the storage node;
receiving target resets from other ports of the second host bus adapter; and
not receiving target resets from other ports of other host bus adapters.

18. The non-transitory computer-readable storage medium of claim 17 in which the method further comprises identifying both the first port of the second host bus adapter and the second host bus adapter as potentially faulty based on determining that the initiators of the target resets are grouped.

19. The non-transitory computer-readable storage medium of claim 15 in which the method further comprises identifying a storage array port as faulty based on logged hardware errors associated with the storage array port.

20. The non-transitory computer-readable storage medium of claim 15 in which the method further comprises identifying an inter-switch link as faulty based on:
receiving a predetermined number of target resets from a first port of a second host bus adapter within a predetermined time period at the first port of the plurality of ports of the storage node;
receiving target resets from other ports of the second host bus adapter;
receiving target resets from other ports of other host bus adapters; and
logging storage array-side link errors.

* * * * *